United States Patent
Gupta et al.

(10) Patent No.: US 10,713,092 B2
(45) Date of Patent: Jul. 14, 2020

(54) DYNAMIC RESOURCE MANAGEMENT OF A POOL OF RESOURCES FOR MULTI-TENANT APPLICATIONS BASED ON SAMPLE EXCEUTION, QUERY TYPE OR JOBS

(71) Applicant: JPMorgan Chase Bank, N.A., New York, NY (US)

(72) Inventors: Akhilesh Gupta, West Chester, PA (US); Suman Kumar Addanki, Chadds Ford, PA (US); James P. Cuddihy, Verona, NJ (US); Jay Rajaram, North Brunswick, NJ (US); Ratikanta Mishra, Bear, DE (US); Michael Aguiling, Tappan, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 172 days.

(21) Appl. No.: 15/860,021

(22) Filed: Jan. 2, 2018

(65) Prior Publication Data
US 2019/0205173 A1  Jul. 4, 2019

(51) Int. Cl.
*G06F 9/50* (2006.01)
*G06F 21/62* (2013.01)
*G06F 16/182* (2019.01)

(52) U.S. Cl.
CPC .......... *G06F 9/5016* (2013.01); *G06F 9/5027* (2013.01); *G06F 16/182* (2019.01); *G06F 21/6218* (2013.01); *G06F 2209/5011* (2013.01)

(58) Field of Classification Search
CPC .............. G06F 16/182; G06F 21/6218; G06F 2209/5011; G06F 9/5016; G06F 9/5027
See application file for complete search history.

(56) References Cited

U.S. PATENT DOCUMENTS

2006/0149714 A1* 7/2006 Fellenstein ............... G06F 8/63
2009/0132488 A1* 5/2009 Wehrmeister ....... G06F 16/2471
(Continued)

OTHER PUBLICATIONS

International Search Report, dated Apr. 11, 2019, from corresponding International Application No. PCT/US2019/012034.
(Continued)

*Primary Examiner* — Meng Al T An
*Assistant Examiner* — Jorge A Chu Joy-Davila
(74) *Attorney, Agent, or Firm* — Greenberg Traurig LLP

(57) ABSTRACT

Systems and methods for resource management for multi-tenant applications in a Hadoop cluster are disclosed. In one embodiment, in an information processing device comprising at least one computer processor, a method for resource management for multi-tenant applications in a Hadoop cluster may include: (1) allocating an initial allocation of a resource in a resource pool to a plurality of tenants, each tenant having a workload; (2) determining a memory requirement for each of the plurality of tenants; (3) determining a maximum number of concurrent queries or jobs for each of the plurality of tenants; (4) determining a memory and vcore requirement for each of the plurality of tenants based on the memory requirement and maximum number of concurrent queries or jobs; and (5) allocating the resources to each of the plurality of tenants.

10 Claims, 5 Drawing Sheets

(56) References Cited

U.S. PATENT DOCUMENTS

| | | | |
|---|---|---|---|
| 2010/0005055 A1* | 1/2010 | An | G06F 16/24534 |
| | | | 707/E17.001 |
| 2010/0205381 A1 | 8/2010 | Canion | |
| 2012/0001925 A1 | 1/2012 | Andonieh et al. | |
| 2013/0081005 A1 | 3/2013 | Gounares et al. | |
| 2015/0347774 A1* | 12/2015 | Krstic | G06F 21/6218 |
| | | | 726/29 |
| 2016/0203404 A1 | 7/2016 | Cherkasova et al. | |
| 2017/0220944 A1* | 8/2017 | Nghiem | G06F 9/4893 |
| 2017/0293447 A1 | 10/2017 | Bivens et al. | |
| 2017/0295108 A1* | 10/2017 | Mahindru | H04L 47/70 |
| 2017/0310607 A1* | 10/2017 | Ruan | H04L 47/781 |
| 2017/0339156 A1 | 11/2017 | Gupta et al. | |
| 2018/0322168 A1* | 11/2018 | Levine | G06F 16/256 |

OTHER PUBLICATIONS

Written Opinion of the International Searching Authority, dated Apr. 11, 2019, from corresponding International Application No. PCT/US2019/012034.

International Searching Authority, PCT International Search Report and Written Opinion, International Application No. PCT/US19/12034, dated Apr. 11, 2019, pp. 1-3.

\* cited by examiner

DYNAMIC RESOURCE MANAGEMENT OF A POOL OF RESOURCES FOR MULTI-TENANT APPLICATIONS BASED ON SAMPLE EXCEUTION, QUERY TYPE OR JOBS

BACKGROUND OF THE INVENTION

1. Field of the Invention

The present invention generally relates to systems and methods for resource management for multi-tenant applications in a Hadoop cluster.

2. Description of the Related Art

In a Hadoop multi-cluster environment, resources are often sold or charge back to the tenants based on, for example, the storage capacity and service memory. Managing these resources is challenging in a multi-tenant environment as some tenants may end-up using these resources exhaustively, while the others use rapidly or less frequently depending on their application or their workload type. Multi-tenancy features in Hadoop are mainly focused around authorization of requests, but not on dynamic resource tracking.

SUMMARY OF THE INVENTION

Systems and methods for resource management for multi-tenant applications in a HADOOP cluster are disclosed. In one embodiment, in an information processing device comprising at least one computer processor, a method for resource management for multi-tenant applications in a Hadoop cluster may include: (1) allocating an initial allocation of a resource in a resource pool to a plurality of tenants, each tenant having a workload; (2) determining a memory requirement for each of the plurality of tenants; (3) determining a maximum number of concurrent queries or jobs for each of the plurality of tenants; (4) determining a memory and virtual core requirement for each of the plurality of tenants based on the memory requirement and maximum number of concurrent queries or jobs; and (5) allocating the resources to each of the plurality of tenants.

In one embodiment, the initial allocation may be based on at least one of an anticipated number of tenants and an anticipated query type or jobs.

In one embodiment, the memory requirement may be based on a sample workload for the tenant, an Explain Plan, an actual job run, etc.

In one embodiment, the maximum number of concurrent queries or jobs may be based on an application requirement for an application executed by the tenant.

In one embodiment, the resource pool may be a dynamic resource pool and may comprise YARN, HBASE, SOLR, and/or IMPALA services.

In one embodiment, the method may further include repeating the steps of allocating the initial allocation, determining the memory requirement, determining the maximum number of concurrent queries or jobs, determining a maximum memory requirement, and allocation the resource for each new tenant as the new tenant is onboarded.

In one embodiment, the method may further include restricting access to the resource using an access control list.

In one embodiment, the workload may comprise at least one of batch, streaming, and archiving.

In one embodiment, each tenant may be guaranteed its allocated resources.

According to another embodiment, a system for resource management for multi-tenant applications in a HADOOP cluster may include a plurality of tenants, each tenant having a workload; a HADOOP cluster comprising a plurality of resources; and an information processing device comprising at least one computer processor. The information processing device may allocate an initial allocation of a resource in a resource pool to each of the plurality of tenants; determine a memory requirement for each of the plurality of tenants; determine a maximum number of concurrent queries or jobs for each of the plurality of tenants; determine a memory and virtual core requirement for each of the plurality of tenants based on the memory requirement and maximum number of concurrent queries or jobs; and allocate the resources to each of the plurality of tenants.

In one embodiment, the initial allocation may be based on an anticipated number of tenants and/or an anticipated query type.

In one embodiment, the memory requirement may based on a sample workload for the tenant, an Explain Plan, or an actual job run.

In one embodiment, the maximum number of concurrent queries or jobs may be based on an application requirement for an application executed by the tenant.

In one embodiment, the allocation of resources may support multiple services including YARN, HBASE, SOLR, and Impala services. In one embodiment, each tenant may be guaranteed the resources that they are allocated.

In one embodiment, the information processing device may restrict access to the resource using an access control list.

In one embodiment, the workload may include at least one of batch, streaming, and archiving.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1A:
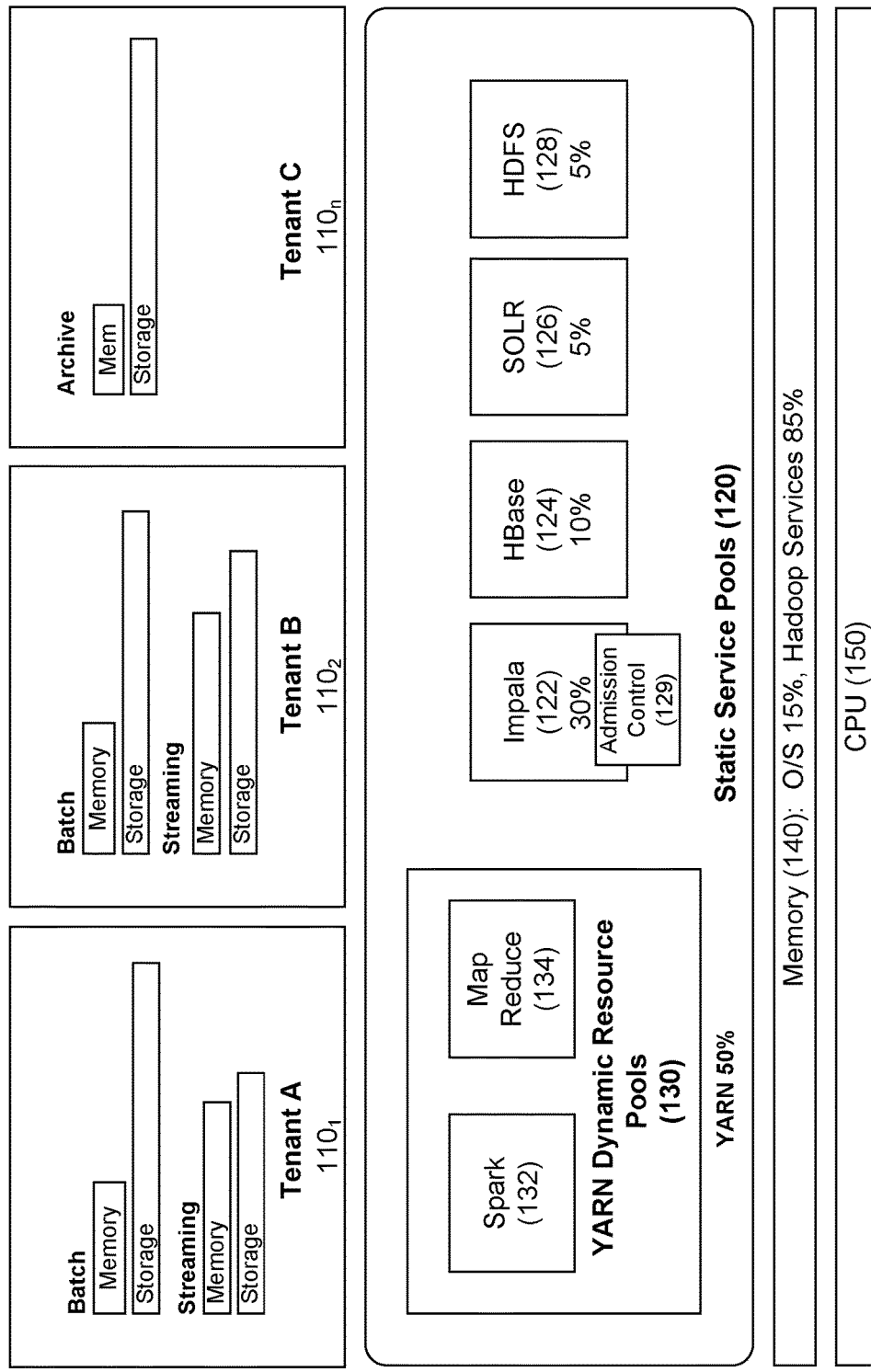
FIG. 1A depicts an architectural diagram of a system for resource management according to one embodiment.

The disclosures of each of U.S. patent application Ser. No. 15/602,339 and U.S. Provisional Patent Application Ser. No. 62/340,284 are hereby incorporated by reference in its entirety.

Embodiments disclosed herein are directed to a systems and methods for managing resources in a HADOOP multi-tenant environment based on category of application. Applications that need resources on Multi-Tenant cluster may be categorized as, for example, Archive, Batch, Streaming (Memory intensive), etc. Based on the category of the application, the tenant may be sized, and based on the size of the tenant, resources may be managed using, for example, one or more of Static Service Allocation, YARN Dynamic Resource Pools, IMPALA Admission Control, and HDFS quotas.

In one embodiment, resources may be "split" among services, such as YARN, HBASE, SOLR, IMPALA, etc. using, for example, Control Groups (cgroups).

In embodiments, cluster resources may be used by several services, such as storage (e.g., HDFS) and compute frameworks, such as YARN, which supports, for example, MapReduce, and SPARK. This would enable multiple services to co-exist on the same physical cluster but logically running within their own boundaries Embodiments may allocate resources such that each tenant is guaranteed to receive its allotted resources even during times when the cluster is at 100% utilization, while making sure that each tenant does not consume more resources than allocated during full cluster load.

Embodiments may provide some or all of the following: (1) effective sharing of cluster resources across multi-tenant applications in a HADOOP cluster environment by defining the standards necessary to provide optimized cluster resource utilization based on the allocated resource capacity for each tenant; (2) static resource allocation, or Static Service Pools, may be set based on a comparison between an expected Service Level Agreement, or SLA, and a balanced workload between streaming jobs and batch jobs; (3) for YARN-integrated HADOOP processing frameworks, YARN dynamic resource pools may be configured based on their workload requirements; IMPALA Admission Control uses per query memory limits to prevent accidental/heavy queries from consuming excessive resources and unexpectedly impacting other queries; (4) Cluster Resource Management (RM) in the HADOOP cluster may provision and manage cluster capacity for multiple tenants based on each tenant's allocated or purchased memory and storage; (5) no violation of existing security requirements and/or policies. (6) the existence of each tenant residing on the multi-tenant environment may not be revealed; (7) data access by users (both human and functional) may be audited; (8) current permissions and/or datasets may be reported; and (9) the ability to run multiple concurrent applications with guaranteed resources.

In embodiments, the amount of memory, CPU cores, and storage may be determined based on a tenant's application category, such as stream processing, batch processing, and archive data storage. Stream processing generally involves the processing of data in real time, or near-real-time, where computations are generally independent and work on small windows of recent data and often times memory intensive computing. Batch processing generally involves accessing large data sets for processing large and complex ETL (extract-transform-load) or reporting jobs, and is generally more concerned with throughput than latency (minutes or more) of individual components of the computation. Archive data storage may involve the storage and occasional processing of data that is no longer actively used, such as older data that is still important to the organization and may be needed for future reference, as well as data that must be retained for regulatory compliance.

Figure 1B:
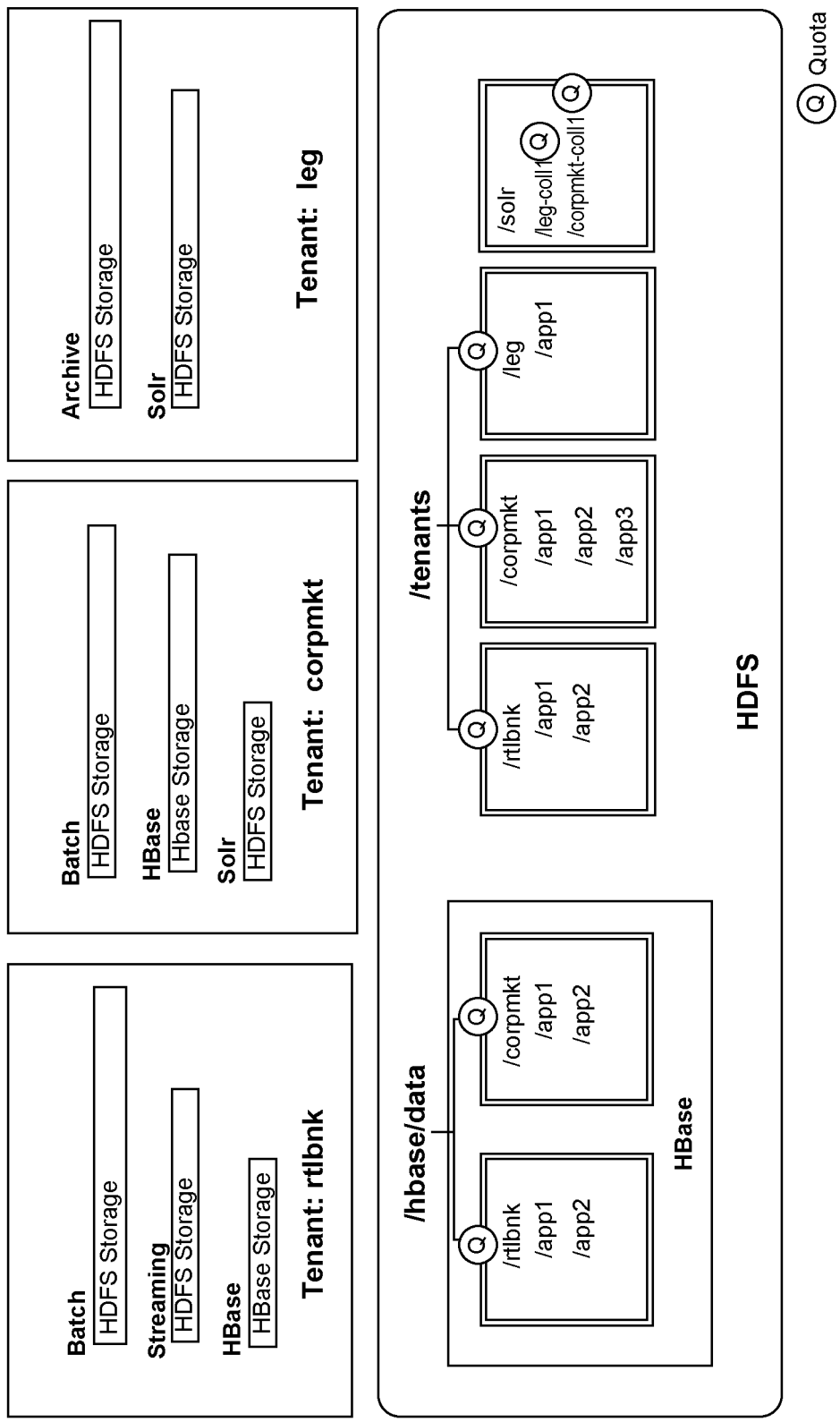
FIG. 1B depicts an architectural diagram of a system for storage management according to one embodiment.

Referring to FIG. 1A and FIG. 1B, an architectural diagram of a system for resource management for multi-tenant applications in a HADOOP cluster is disclosed according to one embodiment. System 100 may include tenants $110_1$, $110_2$, ... $110n$, static service pools 120, memory 140, and CPU(s) 150.

In one embodiment, each tenant $110_1$, $110_2$, ... $110_n$ may have requirements for one or more application category. For example, tenant $110_1$ may have requirements for batch applications and streaming applications. Tenant $110_2$ may also have requirements for batch applications and streaming applications. Tenant $110_n$ may have requirements for archive applications only. Note that these requirements are illustrative only.

Static service pools 120 or queues is the umbrella definition used within CLOUDERA Manager to define Linux control groups, or cgroups, for daemon processes. These cgroups define priorities for resource allocation when the operating system is managing contention. Simply put, cgroups are only a mechanism to handle priorities in heavily utilized systems with CPU cycles. If processes are not contending for resource, cgroups have no effect. Cgroups may also put a boundary on the memory that may be used by a process.

Static service pools 120 may be used to handle service multi-tenancy. Static service pools 120 may define how to handle resources used by multiple services such as Impala 122, HBase 124, SOLR 126, and HDFS 128. Other services may be provided as is necessary and/or desired.

In one embodiment, the resources available to YARN service via static service pools 120 may be subdivided into YARN dynamic resource pool 130s, which may include services such as Spark 132 and Map Reduce 134. Other service pools (e.g., admission control 129) may be provided as is necessary and/or desired.

In one embodiment, YARN dynamic resource pools 130 may be created for each tenant $110_1$, $110_2$, ... $110_n$, and memory and CPU VCores guarantees (e.g., a minimum and maximum) may be configured according to their total allocated capacity (e.g., the amount that the tenant has purchased). In one embodiment, sub-pools may be created within each tenant pool for each application for further breakdown of memory and CPU VCores guarantees among the application sub-pools.

In one embodiment, each of tenant's $110_1$, $110_2$, ... $110_n$ users may be required to specify the "queue name" in which to run their jobs. The queue name may identify the resource pool that the service will use.

In one embodiment, the placement policy on YARN pools may be configured to disable the dynamic creation of pools. For example, the placement policy may be set to "Specified Pool only if the pool exists". An example naming syntax for the resource pool is provided in Table 1, below:

TABLE 1

| Framework | Resource Pool Queue Name Syntax | Example |
|---|---|---|
| MapReduce | mapreduce.job.queuename=<pool name> | yarn jar /opt/cloudera/parcels/CDH-5.3.3-1.cdh5.3.3.p0.5/jars/hadoop-examples.jar terasort -D mapreduce.job.queuename=rtlbnk.cc |

TABLE 1-continued

| Framework | Resource Pool Queue Name Syntax | Example |
|---|---|---|
| Hive | mapred.job.queue.name=<pool name> | /user/pp20010/teragen1<br>/user/pp20010/terasort1<br>SET mapred.job.queue.name=rtlbnk.pbsnk;<br>select count(*) from sample_07; |
| Impala | REQUEST_POOL=<pool name> | SET REQUEST_POOL=rtlbnk.mtg';<br>select count(*) from sample_07; |
| Spark | mapreduce.job.queuename=<pool name> | spark-submit --class org.apache.spark.examples.SparkPi --master yarn-cluster --queue corpmkt.camp /opt/cloudera/parcels/CDH-5.4.3-1.cdh5.4.3.p0.6/lib/spark/lib/spark-examples.jar 10 |

In one embodiment, each pool in the YARN dynamic resource pool 130 may have its access control configured so that only authorized users can submit jobs. In one embodiment, access control may use the same Active Directory groups used for tenant security. The disclosure of U.S. patent application Ser. No. 15/602,339 is hereby incorporated, by reference, in its entirety. For example, for a financial institution, an exemplary resource pool to active directory group mapping is provided in Table 2, below:

TABLE II

| Tenant | Application | Resource Pool Name | Active Directory Groups |
|---|---|---|---|
| Retail Banking | Credit cards | rtlbnk.cc | ND-MT-RTLBNK-CC |
| | Personal Banking | rtlbnk.pbank | ND-MT-RTLBNK-PBANK |
| | Mortgage | rtlbnk.mtg | ND-MT-RTLBNK-MTG |
| Corporate Marketing | Campaign | corpmkt.camp | ND-MT-CORPMKT-CAMP |
| | General Marketing | corpmkt.gmkt | ND-MT-CORPMKT-GMKT |

In one embodiment, the allocation of static resources in static service pool 120 may be set to an initial starting point based on, for example, a balanced workload between streaming applications and batch applications.

In one embodiment, each tenant 110 may be assigned an initial allocation for each service 122, 124, 126, and 128, and YARN dynamic resource pool 130. For example, in FIG. 1, tenant 110₁ may be assigned 50% of YARN dynamic resource pool 130, 30% of Impala 122, 10% of Hbase 124, 5% of SOLR 126, and 5% of HDFS 128. These allocations are exemplary only, and other initial allocations and services may be set as is necessary and/or desired.

In one embodiment, machine learning may be used to analyze actual workloads and compare them to expected SLAs, and may change the allocation. This may be performed periodically (e.g., daily, weekly, bi-weekly, monthly, etc.), on demand, or as otherwise necessary and/or desired.

In one embodiment, YARN dynamic resource pools 130 may be configured. In one embodiment, the settings may be based on memory and cores that the tenant has procured or been otherwise allocated. This may be after the tenant's workload and workload requirement have been analyzed.

In one embodiment, a scheduler may be configured using for example, the YARN scheduling framework.

In one embodiment, Impala Admission Control 129 may be used. For Impala service 122, Impala queries may be prioritized within a guaranteed static resource allocation by configuring admission control to provide multi-tenancy within Impala. Admission control 129 may let the tenants use the resources allocated to them.

For example, the allocation may make certain queries (e.g., important queries run first/faster/better. Note that, in one embodiment, the Impala Resource Pools 129 may be different from the YARN Dynamic Resource Pools 130. Impala resource pools 122 may use per query memory limits to prevent accidental/heavy queries from consuming excessive resources and unexpectedly impacting other queries.

In one embodiment, Impala Admission Control 129 may be configured to control variables such as the number of queries allowed to execute concurrently in each pool; the aggregate memory limit across the cluster which queries in each pool can use, query timeout settings, the number of queries that can be queued for execution in each pool, etc.

In one embodiment, configuration values may be based on a tenant's procured capacity so that a high priority pool will have more memory, more concurrent query execution, longer timeout settings, etc. Low priority queries may wait in the queue longer and concurrent execution may be limited by both execution slots and concurrent memory usage.

Figure 2:
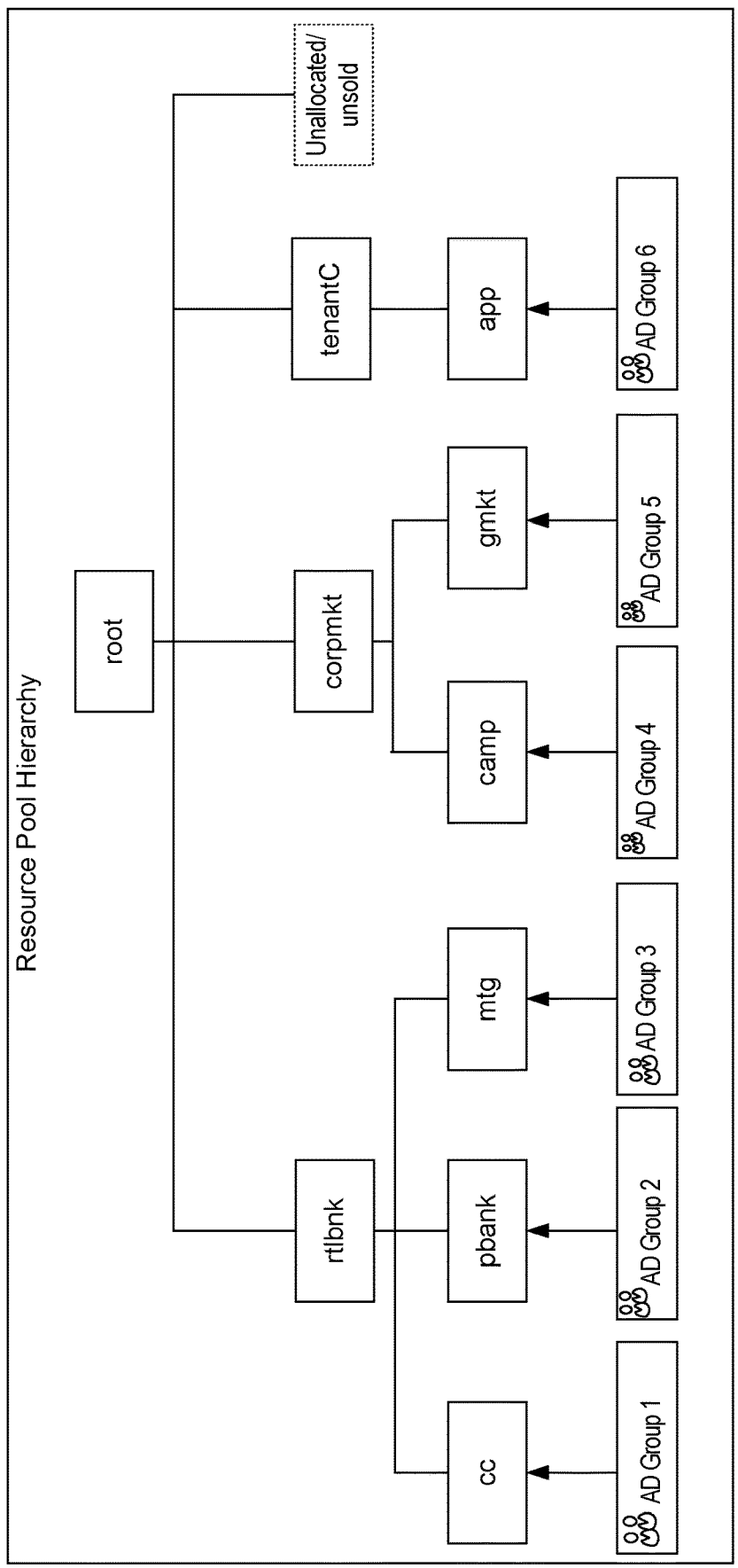
FIG. 2 depicts a resource pool hierarchy for a tenant and the users that use this resource pool according to one embodiment.

Referring to FIG. 2, a resource pool naming convention is disclosed according to one embodiment. In one embodiment, a standard naming convention for pool services may be root.tenantname.appname. Other naming conventions may be used as is necessary and/or desired. Multiple pools may be created for a tenant as is necessary and/or desired.

In one embodiment, tenant pool weights may be set to 1 because the minimum and maximum memory and CPU is used for YARN and Impala, and no preference is given to a particular tenant.

In one embodiment, the minimum and maximum memory and CPU settings may be used to allocate and enforce compliance for compute resources to each tenant for YARN.

The total amount of aggregate memory that a tenant procures may be allocated and distributed to the tenant-specific resource pools. Application resource pools may be created for each tenant application and memory and CPU may be subdivided across each application.

For example, the minimum memory for YARN dynamic resource pools 130 may be the tenants' guaranteed/purchased memory; the maximum memory may be calculated as a percentage (e.g., 80%) of the cluster memory. The CPU allocation may be based on the tenant sizing, so that a tenant who procured "streaming" workload category, for example, will be allocated a higher number of virtual cores ("vcores"), while "archive" workloads may be allocated fewer CPU clock cycles. In one embodiment, machine learning may be used to modify this setting based on actual workload profiles observed in the cluster.

In one embodiment, system and pool-wide memory limits may be set. For example, actual Impala memory limits may be based on query estimation or the per-query memory limits that a tenant user may set, such as when a tenant has well-defined workloads and the tenant can instrument its scripts with query memory limits (e.g., set mem_limit=64 g).

An illustrative example of a calculation that may be used for initial estimate for values that can be set as Impala Max Memory for a tenant is as follows. Note that unless all of tenants' queries (complexity, number of concurrent, and data volume) are known ahead of time, the Max Memory setting may need to be updated based on actual workload performance.

With Impala Resource pools, for a query that involves performing joins on large tables, the memory requirement may be calculated as the size of the smaller table times a selectivity factor from the predicate times a projection factor times a compression ratio. For example, assume that table B is 100 TB in Parquet format with 200 columns. The predicate on B (i.e., the "WHERE" clause) will select only 10% of the rows from B and for projection, 5 columns out of 200 columns are projected. Because Snappy compression gives 3 times compression, a compression factor of 3× is used.

Thus, 100 TB*10%*5/200*3=0.75 TB (750 GB). Thus, for this example, the Max Memory for the tenant's queue may be set to 750 GB.

Figure 3:
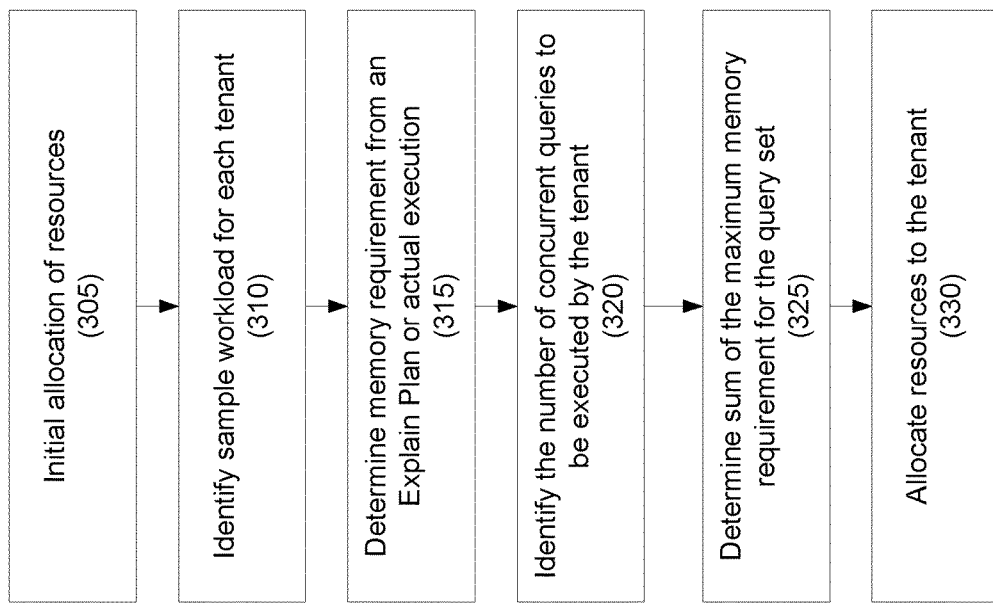
FIG. 3 illustrates a method for resource management at a tenant level according to one embodiment.

Referring to FIG. 3, a method for resource management at a tenant level according to one embodiment is provided. In step 305, an initial allocation of the resource may be made. In one embodiment, the initial resource allocation may be based on, for example, anticipated number of tenants, anticipated tenant queries, etc. In one embodiment, the initial allocation may be based on machine learning. For example, referring to FIG. 1A, the initial allocation for tenant A may be 50% of YARN dynamic resource pool 130, 30% of Impala 122, 10% of Hbase 124, 5% of SOLR 126, and 5% of HDFS 128.

In step 310, a sample workload from each tenant may be identified, and, in step 315, for each workload, the memory requirement from an Explain Plan (when running an explain plan is possible), or from a run the actual job to gather the information on the memory needed for the workload, may be determined. For example, the maximum between Explain Plan and the actual memory use. This may be set as the memory requirement for the query.

Next, in step 320, the number of concurrent queries for an Impala resource pool may be driven by an Application requirement. The number of concurrent queries also needs to be factored into the calculation of maximum memory for the Impala resource pool.

In one embodiment, the maximum queries may be set to avoid, for example, over subscription to CPU, disk, network because this can lead to longer response time (without improving throughput). It works best with homogeneous workload. In one embodiment, after setting a default value, the actual usage (e.g., the number of queries running at the same time) in Cloudera Manager may be viewed. If the number of queries running is the same as the maximum number of queries that is set, and other queries are waiting (i.e., queued queries is exceeded), then both values may be increased by a reasonable amount (e.g., 10-20%) until the tenant's queries are sufficiently completing within reasonable time.

In step 325, the sum of the maximum memory requirement for the query set may be determined. Each group of queries may be set to the maximum memory requirement for from the query set.

Next, in step 330, the resources may be allocated to the tenant. In one embodiment, the tenant may be allocated the memory derived in step 315.

Note that the sum of all memory assigned to all groups may be greater than total memory available.

In one embodiment, steps 310-330 may be repeated as each tenant is onboarded, periodically, or as necessary and/or desired.

For Impala Max Queries and Max Query Queue, the initial defaults may be set to a reasonable number (e.g., 50 maximum number of queries and a 20 maximum query queue). Actual Impala query workload may be assessed and machine learning may be used to update these values.

In one embodiment, access control lists may be used to permit a tenant user to use its allocated YARN dynamic resource pool. This may be controlled by setting each YARN dynamic resource pool's submission access control to Active directory groups where the tenant belongs. The default and undeclared pool settings may be set to false (i.e., disabled). This requires all jobs in the cluster to run within the established pools. In one embodiment, a separate pool for cluster administrators may be created as is necessary and/or desired.

In one embodiment, a minimum share pre-emption timeout may be set to an initial value, such as 15, which is the number of seconds the pool remains under its minimum share before it tries to preempt containers to take resources from other pools. Machine learning may use actual workload profiles to update this value on a per-tenant basis.

In one embodiment, the maximum number of running applications may be set to an initial value, such as 25. This value may be useful when a tenant application must submit many jobs at once, or in general to improve performance if running too many applications at once would cause too much intermediate data to be created or too much context-switching. Limiting the applications does not cause any subsequently submitted applications to fail, only to wait in the scheduler's queue until some of the tenant's earlier applications finish. Machine learning may use actual job run analysis to update this value.

HBase and Solr are not managed by YARN, and do not have dynamic resource management capabilities. Thus, in one embodiment, for HBase, the number IOPS (Input Output operations per second) for a payload of 1 Kilo Byte may be used to determine the total IOPS supported by HBase service on the cluster. IOPS throttling may be used to manage tenant HBase resource allocation.

In one embodiment, Solr resource management may be governed by specifying the amount of memory available to Solr servers. This memory allocation is directly related to the amount of data that is indexed in collections, thus is driven by use cases.

Figure 4:
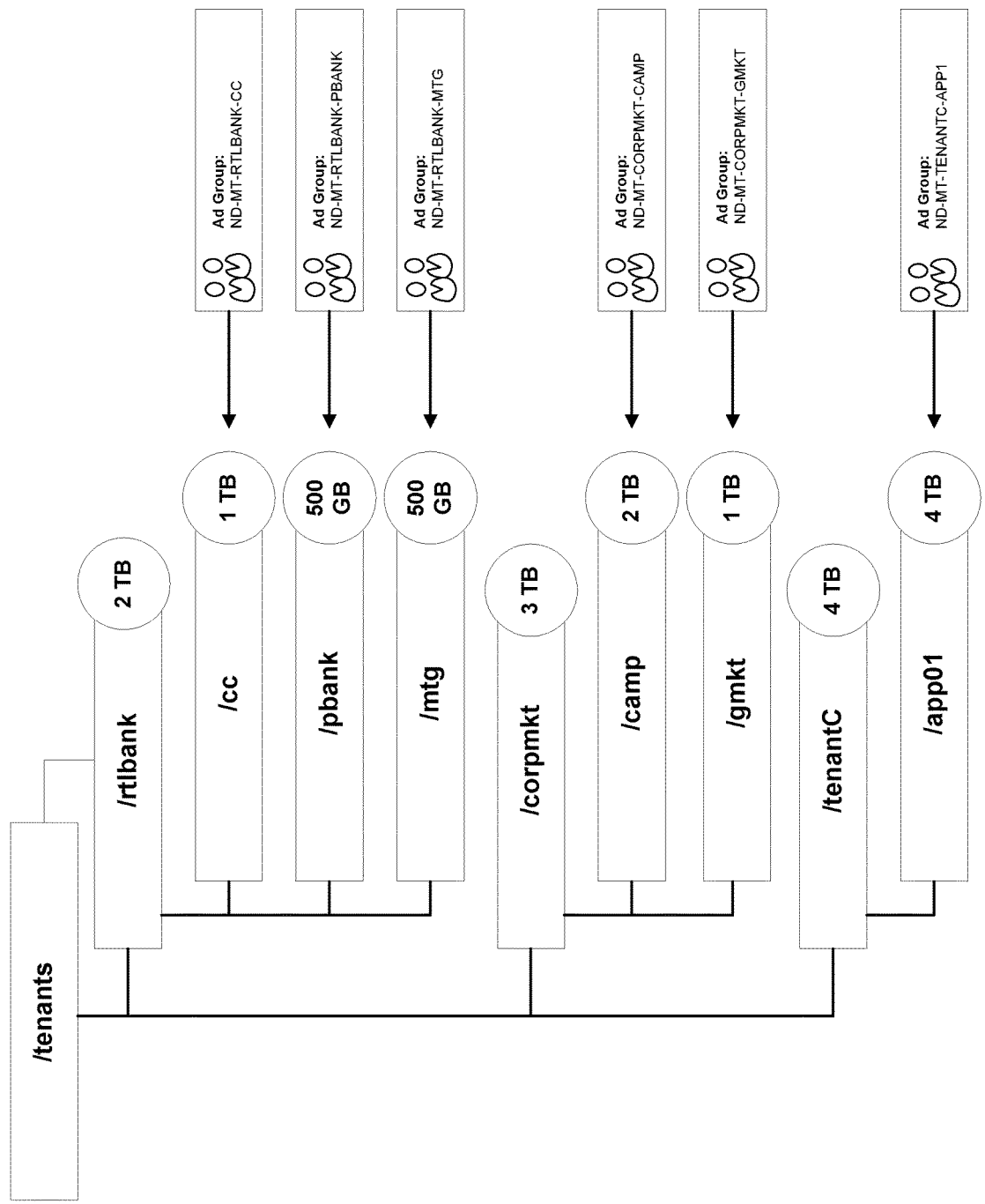
FIG. 4 depicts a high level tenant folder design hierarchy with defined storage quotas according to one embodiment.

In one embodiment, each tenant's purchased and allotted HDFS (which includes HBase tables) storage may be controlled using HDFS Quota. Referring to FIG. 4, a high level folder design hierarchy is illustrated according to one embodiment. The hierarchy may be /tenants/tenant[A,B,C]/app[01,02]. An exemplary tenant directory structure is disclosed in U.S. patent application Ser. No. 15/602,339 which is hereby incorporated, by reference, in its entirety.

HDFS space quota may be set on the tenant level folder. Each tenant may choose to further divide its storage quotas to the application level. For a financial institution, an exemplary HDFS quota to active directory group mapping is provide in Table 3, below.

TABLE 3

| Tenant | Application | Resource Pool Name | Quota | Active Directory Groups |
|---|---|---|---|---|
| Retail Banking | | /tenants/rtlbnk | | |
| | Credit Cards | /tenants/rtlbnk/cc | Yes | ND-MT-RTLBNK-CC |
| | Personal Banking | /tenants/rtlbnk/pbank | Yes | ND-MT-RTLBNK-PBANK |
| | Mortgage | /tenants/rtlbnk/mtg | Yes | ND-MT-RTLBNK-MTG |
| Corporate Marketing | | /tenants/corpmkt | | |
| | Campaign | /tenants/corpmkt/camp | Yes | ND-MT-CORPMKT-CAMP |
| | General Marketing | /tenants/corpmkt/gmkt | Yes | ND-MT-CORPMKT-GMKT |

Each cluster user may have a home folder in HDFS. A quota may be set on the user root folder level (/user) which includes all users from all tenants.

In one embodiment, space quotas for HBase tables (under /hbase directory) should be set to ensure that it is given plenty of space to accommodate expected sizes. Exceeding quota is HBase may lead to service unavailability and potential data loss. A general guideline for setting HBase size quota is to double the size value for 1 year estimated by each tenant for initial size and growth rate. In one embodiment, machine learning may be used to monitor the size of data on a regular basis, and may increase the quota if spikes in data volume are more than what was set.

For example, Tenant A's HBase tables in its specific HBase namespace folder total 50 TB, and the estimated growth rate is 1 TB per month, a reasonable quota would be 124 TB (e.g., 50+1×12 months×2). Other methods and techniques for setting the quotas may be used as is necessary and/or desired.

It should be noted that although several embodiments have been disclosed, the embodiments disclosed herein are not exclusive to one another.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for dynamic resource management for multi-tenant applications in a distributed environment of a computational computer cluster that stores and analyzes big data, the method is performed by an information processing device comprising at least one computer processor, the method comprising the steps of:
   determining, as each new tenant is onboarded, an initial allocation of resources from a resource pool to a plurality of tenants, each tenant having an anticipated query type or jobs, wherein the resource pool supports different services and the initial allocation of the resources is a percentage of each of the different services based on the anticipated query type or jobs;
   wherein the anticipated query type or jobs are associated with application categories comprising at least one of batch, streaming, and archiving;
   assigning to each tenant of the plurality of tenants the initial allocation of resources;
   determining a baseline tenant memory requirement for each of the plurality of tenants based on a sample execution or an Explain Plan of a query type or jobs;
   determining a maximum number of concurrent queries or jobs for each of the plurality of tenants based on an application category requirement for an application executed by the tenant;
   executing the anticipated query type or jobs;
   monitoring an actual number of the concurrent queries or jobs running, and when the actual number of the concurrent queries is the same as the determined maximum number of concurrent queries and additional queries are waiting:
      determining an actual memory requirement and an actual virtual core requirement for each of the plurality of tenants based on the baseline memory requirement and the monitored actual number of the concurrent queries or jobs; and
      updating the initial allocation of the resources with additional resources based on the determining until queries are completed; and
   allocating the resources to each of the plurality of tenants based on the updated initial allocation.

2. The method of claim 1, wherein the initial allocation is further based on an anticipated number of tenants.

3. The method of claim 1, wherein the resource pool is a dynamic resource pool.

4. The method of claim 1, further comprising:
   restricting access to at least one of the resources using an access control list.

5. The method of claim 1, wherein each tenant is guaranteed its initial allocation of resources.

6. A system for dynamic resource management for multi-tenant applications in a distributed environment of a computational computer cluster that stores and analyzes big data, the system comprising an information processing device comprising at least one computer processor that performs the following:
   determines, as each new tenant is onboarded, an initial allocation of resources from a resource pool to each of a plurality of tenants, each tenant having an anticipated query type or jobs, wherein the resource pool comprises a plurality of resources supported by different services and the initial allocation of resources is a percentage of each of the different services based on the anticipated query type or jobs;
   wherein the anticipated query type or jobs are associated with application categories comprising at least one of batch, streaming, and archiving;
   assigns to each of the tenants the initial allocation of resources;
   determines a baseline tenant memory requirement for each of the plurality of tenants based on a sample execution or an Explain Plan of a query type or jobs;
   determines a maximum number of concurrent queries or jobs for each of the plurality of tenants based on an application category requirement for an application executed by the tenant;
   executes the anticipated query type or jobs;
   monitors an actual number of the concurrent queries or jobs running, and when the actual number of the concurrent queries is the same as the determined maximum number of concurrent queries and additional queries are waiting:
      determines an actual memory requirement and an actual virtual core requirement for each of the plurality of tenants based on the baseline memory requirement and the monitored actual number of concurrent queries or jobs; and
      updates the initial allocation of the resources with additional resources based on the determining until queries are completed; and
   allocates the resources to each of the plurality of tenants based on the updated initial allocation.

7. The system of claim 6, wherein the initial allocation is further based on and an anticipated query type.

8. The system of claim 6, wherein the resource pool is a dynamic resource pool.

9. The system of claim 6, further comprising:
   restricting access to the resource using an access control list.

10. The system of claim 6, wherein access to at least one of the resources is restricted using an access control list.

* * * * *